US012548883B2

(12) United States Patent
Chang et al.

(10) Patent No.: US 12,548,883 B2
(45) Date of Patent: Feb. 10, 2026

(54) ELECTRONIC DEVICE CO-CONSTRUCTED WITH HINGE ANTENNA AND HINGE ANTENNA THEREOF

(71) Applicant: ASUSTeK COMPUTER INC., Taipei (TW)

(72) Inventors: Shih-Hsun Chang, Taipei (TW); Min-Yang Li, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 228 days.

(21) Appl. No.: 18/467,924

(22) Filed: Sep. 15, 2023

(65) Prior Publication Data

US 2024/0213655 A1 Jun. 27, 2024

(30) Foreign Application Priority Data

Dec. 21, 2022 (TW) ................................. 111149311

(51) Int. Cl.
*H01Q 1/22* (2006.01)
*H01Q 1/44* (2006.01)

(52) U.S. Cl.
CPC ............. *H01Q 1/2266* (2013.01); *H01Q 1/44* (2013.01)

(58) Field of Classification Search
CPC ......... H01Q 1/084; H01Q 1/2266; H01Q 1/44
See application file for complete search history.

(56) References Cited

U.S. PATENT DOCUMENTS 6,308,377 B1 * 10/2001 Maatta ................ H04M 1/0216 16/342
2006/0105819 A1 * 5/2006 Liao .................... B60R 11/0241 455/569.1
2007/0194994 A1 * 8/2007 Waltho ................. H01Q 1/2258 343/702
2014/0292613 A1 10/2014 Hsiao et al.
2015/0102966 A1 * 4/2015 Chiu ........................ H01Q 1/24 343/702
2018/0116058 A1 * 4/2018 Sullivan ................ G06F 1/1607
2018/0164803 A1 * 6/2018 Liang ................... G05D 1/0016
2018/0254540 A1 * 9/2018 Yoo ......................... H01Q 1/243
2023/0350467 A1 * 11/2023 Chang ................... G06F 1/1681
2024/0213655 A1 * 6/2024 Chang ....................... H01Q 1/44
2025/0105490 A1 * 3/2025 Chiotellis ................ H01Q 1/38

FOREIGN PATENT DOCUMENTS

CN 209169380 U 7/2019
CN 112952347 A 6/2021
TW 201438335 A 10/2014
TW 201840060 A 11/2018

* cited by examiner

*Primary Examiner* — Thien M Le

(74) *Attorney, Agent, or Firm* — McClure, Qualey & Rodack, LLP

(57) ABSTRACT

An electronic device co-constructed with a hinge antenna and the hinge antenna thereof are provided. The electronic device includes a first casing, a second casing, a hinge assembly, and a hinge antenna. The hinge assembly is connected to the first casing and the second casing, so that the first casing and the second casing are opened and closed through rotation of the hinge assembly. The hinge assembly includes a horizontal fixed shaft. The hinge antenna is mounted on the horizontal fixed shaft and fixed on the hinge assembly. Therefore, the hinge antenna is mounted on the hinge assembly on the premise of maintaining the original appearance design, to improve the space utilization of the antenna.

10 Claims, 5 Drawing Sheets

ELECTRONIC DEVICE CO-CONSTRUCTED WITH HINGE ANTENNA AND HINGE ANTENNA THEREOF

CROSS-REFERENCE TO RELATED APPLICATION

This application claims the priority benefit of Taiwan Application Serial No. 111149311, filed on Dec. 21, 2022. The entirety of the above-mentioned patent application is hereby incorporated by reference herein and made a part of the specification.

BACKGROUND OF THE INVENTION

Field of the Invention

The disclosure relates to an electronic device co-constructed with a hinge antenna and the hinge antenna thereof.

Description of the Related Art

Compared with a conventional antenna structure that an antenna is disposed in a metal casing, a hinge antenna has advantages of good radiation efficiency and the efficiency being less susceptible to opening and closing angles of the metal casing. However, compared with other antenna types, the biggest disadvantage of the existing hinge antenna is that an additional antenna area needs to be opened in the hinge antenna, or a special hinge design is adopted to match an antenna sleeve design. This causes an excessive overall cavity size of the hinge antenna or increases the difficulty of a hinge mechanism design. Alternatively, a hinge casing is made of a metal material and a radiation opening is provided in an appearance of the casing for radiation. This affects the product reliability and destroys appearance. Therefore, the design of the hinge antenna faces considerable limitations and the space utilization of the antenna is not improved.

BRIEF SUMMARY OF THE INVENTION

The disclosure provides an electronic device co-constructed with a hinge antenna. The electronic device includes a first casing, a second casing, a hinge assembly, and a hinge antenna. The hinge assembly is connected to the first casing and the second casing, so that the first casing and the second casing are opened and closed through rotation of the hinge assembly. The hinge assembly includes a horizontal fixed shaft. The hinge antenna is mounted on the horizontal fixed shaft and fixed on the hinge assembly.

The disclosure further provides a hinge antenna, disposed on a hinge assembly of an electronic device. The hinge assembly includes a horizontal fixed shaft. The hinge antenna includes an antenna base, an antenna radiation pattern, a feed-in contact, and a conductor portion. An accommodating space and a fixed hole are provided in the antenna base. The fixed hole is located on one side of the accommodating space. The antenna radiation pattern is located on the antenna base. The feed-in contact is located on the antenna base and electrically connected to the antenna radiation pattern to receive and transmit a radio frequency signal. The conductor portion is located on an inner wall of the fixed hole of the antenna base. A fixing assembly passes through the hinge assembly and is fixedly connected to the fixed hole to be electrically connected to the conductor portion. In this way, the horizontal fixed shaft is located in the accommodating space to fix the hinge antenna onto the hinge assembly.

Based on the above, the disclosure provides an electronic device co-constructed with a hinge antenna and the hinge antenna thereof. The hinge antenna is directly designed under an original appearance, or designed in an inner space of the hinge assembly. In this way, the hinge assembly and the hinge antenna are co-constructed to greatly reduce the overall size of the hinge antenna, and achieve an operating bandwidth and good radiation characteristics of a required broadband system.

DETAILED DESCRIPTION OF THE EMBODIMENTS

Embodiments of the disclosure are described below with reference to the accompanying drawings. In addition, the drawings in the embodiments omit some components or structures to clearly show the technical features of the disclosure. In these drawings, the same number represents the same or similar component or circuit. It is to be understood that although the terms "first", "second", and the like are used herein to describe various components, portions, regions, or functions. However, these components, portions, regions, and/or functions are not limited by these terms. These terms. are used only to separate one component, portion, region, or function from another component, portion, region, or function.

Figure 1:
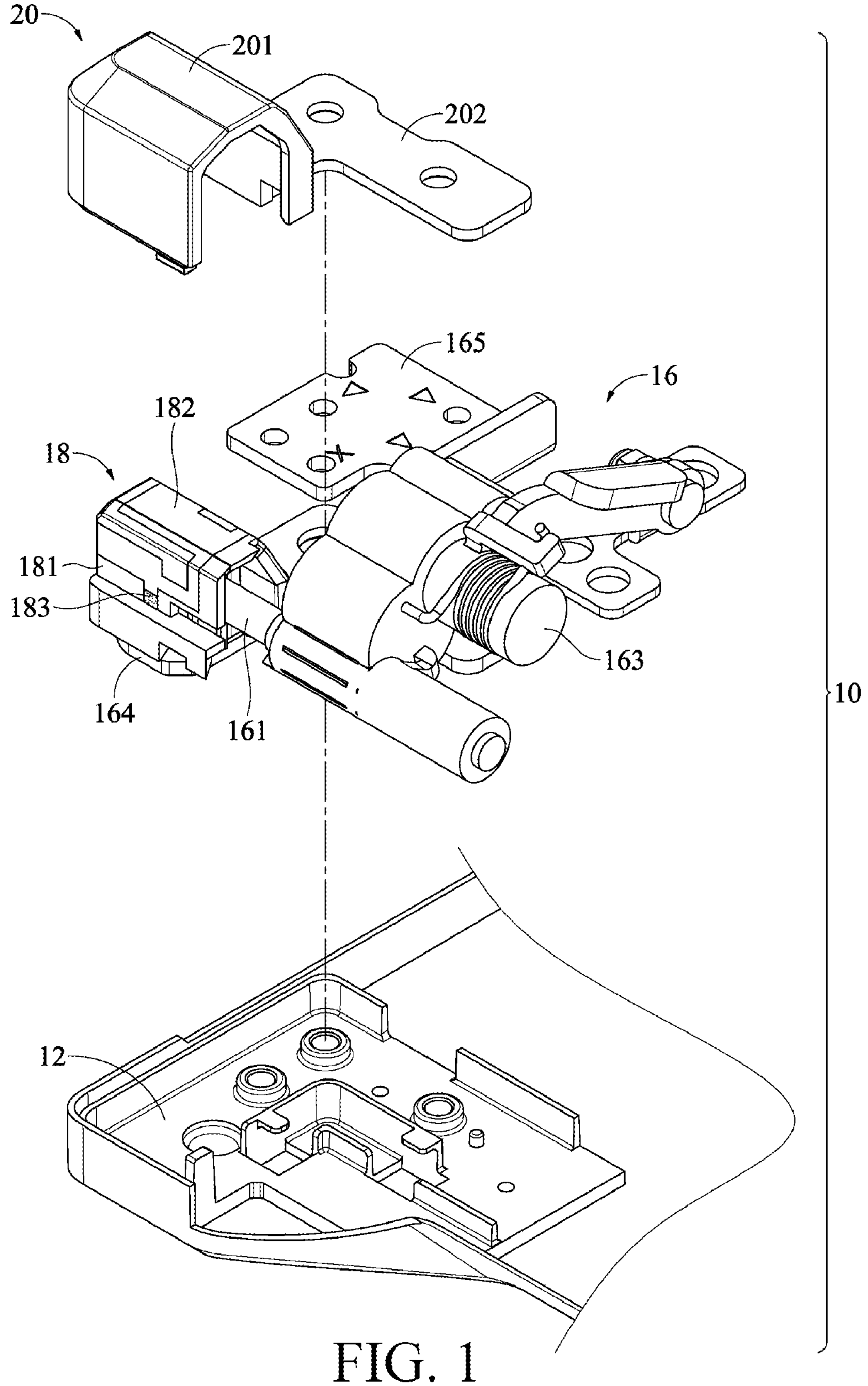
FIG. 1 is a schematic exploded view of an electronic device according to an embodiment of the disclosure.
Figure 2:
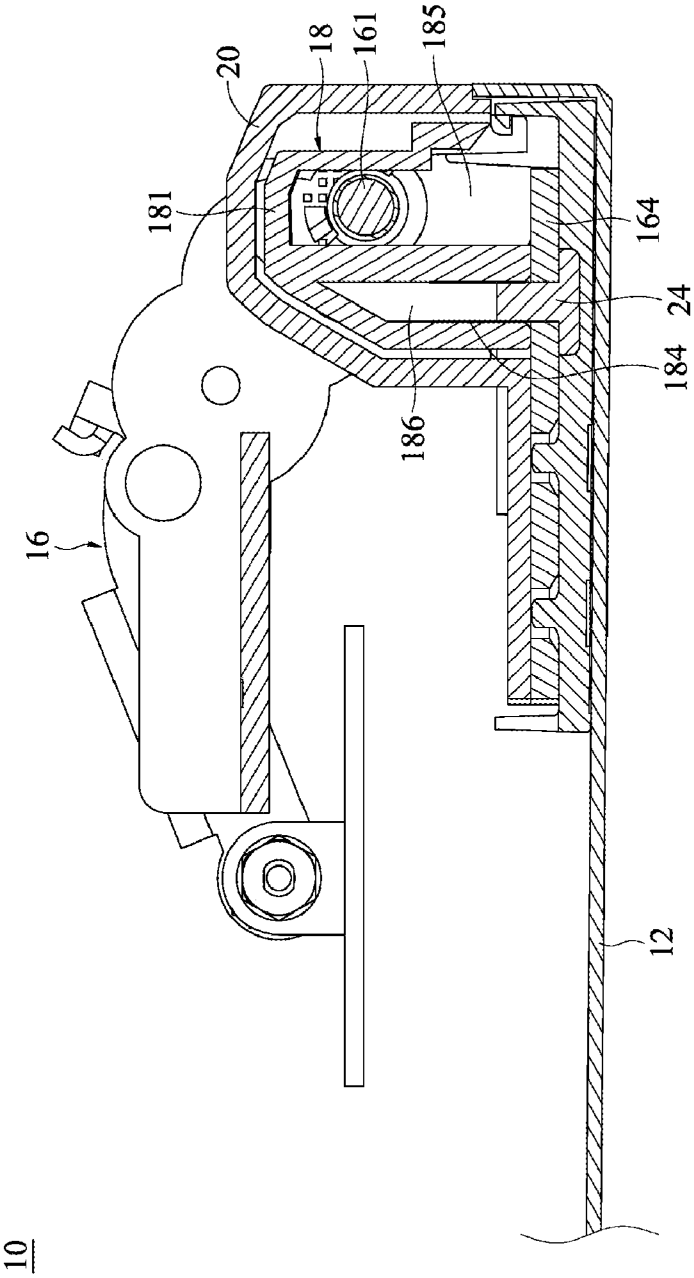
FIG. 2 is a schematic cross-sectional view of a partial structure of an electronic device according to an embodiment of the disclosure.

Referring to FIG. 1 and FIG. 2 together, an electronic device 10 co-constructed with a hinge antenna includes a first casing 12, a second casing (not shown in the figures), a hinge assembly 16, and a hinge antenna 18. In the electronic device 10, the hinge assembly 16 is connected to the first casing 12 and the second casing (not shown in the figures), so that the first casing 12 and the second casing are opened and closed through rotation of the hinge assembly 16. The hinge assembly 16 includes a horizontal fixed shaft 161. The hinge antenna 18 is mounted on the horizontal fixed shaft 161 and fixed on the hinge assembly 16.

In an embodiment, the electronic device 10 is a notebook computer. Any electronic device 10 having a mobile communication function and a hinge design is covered in the disclosure. Based on this, when the electronic device 10 is a notebook computer, the first casing 12 is an upper casing (commonly known as piece A and piece B) with a display in the notebook computer. The second casing (not shown in the figures) is a lower casing (commonly known as piece C and piece D) with a keyboard system in the notebook computer.

As shown in FIG. 1 and FIG. 2, the electronic device 10 further includes a hinge cover 20. The hinge cover 20 is fixed on the hinge assembly 16 and covers the hinge antenna 18, so that the hinge antenna 18 is located between the hinge cover 20 and the hinge assembly 16. The hinge cover 20 includes a cover portion 201 and a fixed portion 202. One side of the cover portion 201 is connected to the fixed portion 202. The cover portion 201 is covered above the hinge antenna 18 and fixed on the hinge assembly 16 using the fixed portion 202.

Figure 3:
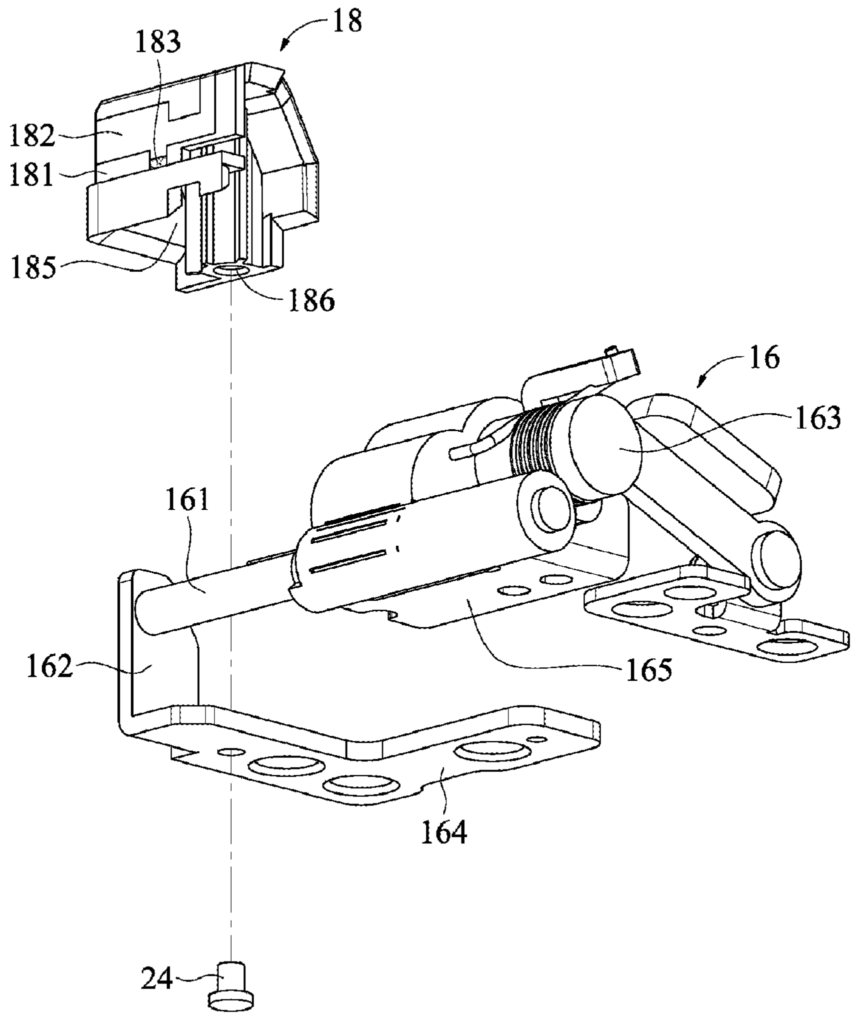
FIG. 3 is a schematic structural diagram of a hinge assembly and a hinge antenna according to an embodiment of the disclosure.
Figure 4:
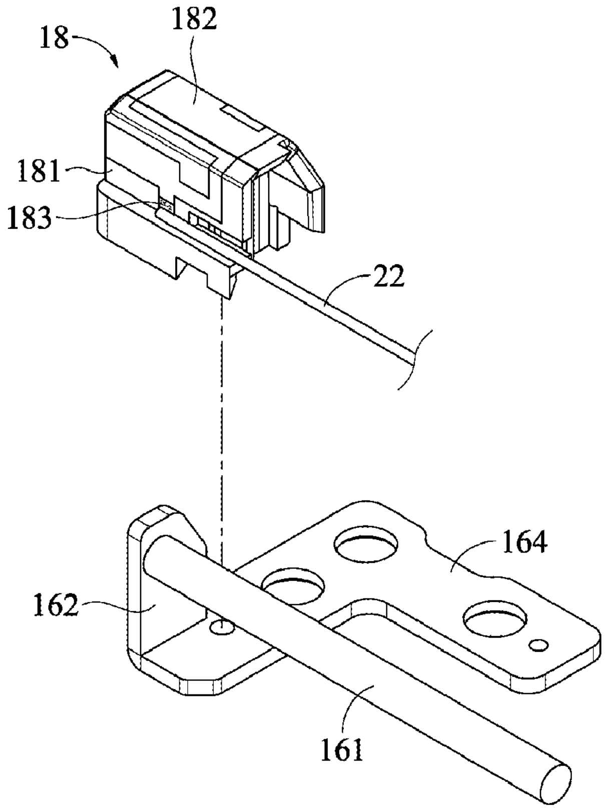
FIG. 4 is a schematic structural diagram of a hinge antenna and a horizontal fixed shaft according to an embodiment of the disclosure.

Referring to FIG. 1, FIG. 2, and FIG. 3 together, in an embodiment, the hinge assembly 16 includes: a vertical fixed support plate 162, a horizontal fixed shaft 161, a metal rolling bearing 163, a first locking member 164, and a second locking member 165. One end of the horizontal fixed shaft 161 is vertically connected to one end of the vertical fixed support plate 162. The metal rolling bearing 163 is disposed at an other end of the horizontal fixed shaft 161. The first locking member 164 is vertical connected to the vertical fixed support plate 162 to be located on one side of the horizontal fixed shaft 161. The first locking member 164 is used for connecting to the first casing 12. The hinge antenna 18 and the fixed portion 202 of the hinge cover 20 are fixed on the first locking member 164. The second locking member 165 is connected to the metal rolling bearing 163 and located on an other side of the horizontal fixed shaft 161. The second locking member 165 is used for connecting to the second casing. The horizontal fixed shaft 161, the vertical fixed support plate 162, the metal rolling bearing 163, the first locking member 164, and the second locking member 165 in the hinge assembly 16 are all made of a metal material to provide solid connections.

Referring to FIG. 1, FIG. 2, FIG. 3, and FIG. 4 together, in an embodiment, the hinge antenna 18 used by the electronic device 10 is accommodated in an inner space between the hinge cover 20 and the hinge assembly 16. The hinge antenna 18 further includes: an antenna base 181, an antenna radiation pattern 182, a feed-in contact 183, and a conductor portion 184. An accommodating space 185 is provided in the antenna base 181. A fixed hole 186 is provided on one side of the accommodating space 185. The antenna base 181 is made of a non-conductive material, such as a common plastic. The antenna radiation pattern 182 is located on the antenna base 181 to serve as a main radiation body of the hinge antenna 18. The antenna radiation pattern 182 is located on an outer surface of the antenna base 181, or on both an inner surface and an outer surface of the antenna base 181. The pattern distribution and position of the antenna radiation pattern 182 are designed according to actual radiation requirements. The feed-in contact 183 is located on the antenna base 181 and electrically connected to the antenna radiation pattern 182 to receive and transmit a radio frequency signal. The feed-in contact 183 is further connected to a signal line 22, usually a coaxial cable. The signal line 22 is electrically connected to the feed-in contact 183 to connect to a radio frequency circuit at a rear end through the signal line 22. The conductor portion 184 is located on an inner wall of the fixed hole 186 of the antenna base 181. A fixing assembly 24 passes through the first locking member 164 of the hinge assembly 16 and is fixedly connected to the fixed hole 186 to be electrically connected to the conductor portion 184, so that the horizontal fixed shaft 161 is located in the accommodating space 185 of the antenna base 181 to fix the hinge antenna 18 onto the hinge assembly 16.

The fixing assembly 24 is a metal fixing assembly. The fixing assembly 24 is disposed in the hinge antenna 18 to lock the hinge antenna 18 on the first locking member 164 of the hinge assembly 16, and is in contact with the conductor portion 184 on the inner wall of the fixed hole 186 to be partially overlapped. In addition to having the effect of the fixing the hinge antenna 18, the fixing assembly 24 is electrically connected to the conductor portion 184 of the hinge antenna 18 and the first locking member 164, so that the fixing assembly 24 also serves as an antenna for grounding.

In an embodiment, the hinge antenna 18 is completed by laser carving. In addition, the hinge antenna 18 is also manufactured by a soft printed circuit board (FPC), a metal iron piece, a soft and hard composite board, and other processes.

In an embodiment, the antenna radiation pattern 182 on the antenna base 181 of the hinge antenna 18 is made of a conductive metal material, such as silver, copper, aluminum, iron, or an alloy thereof.

Figure 5:
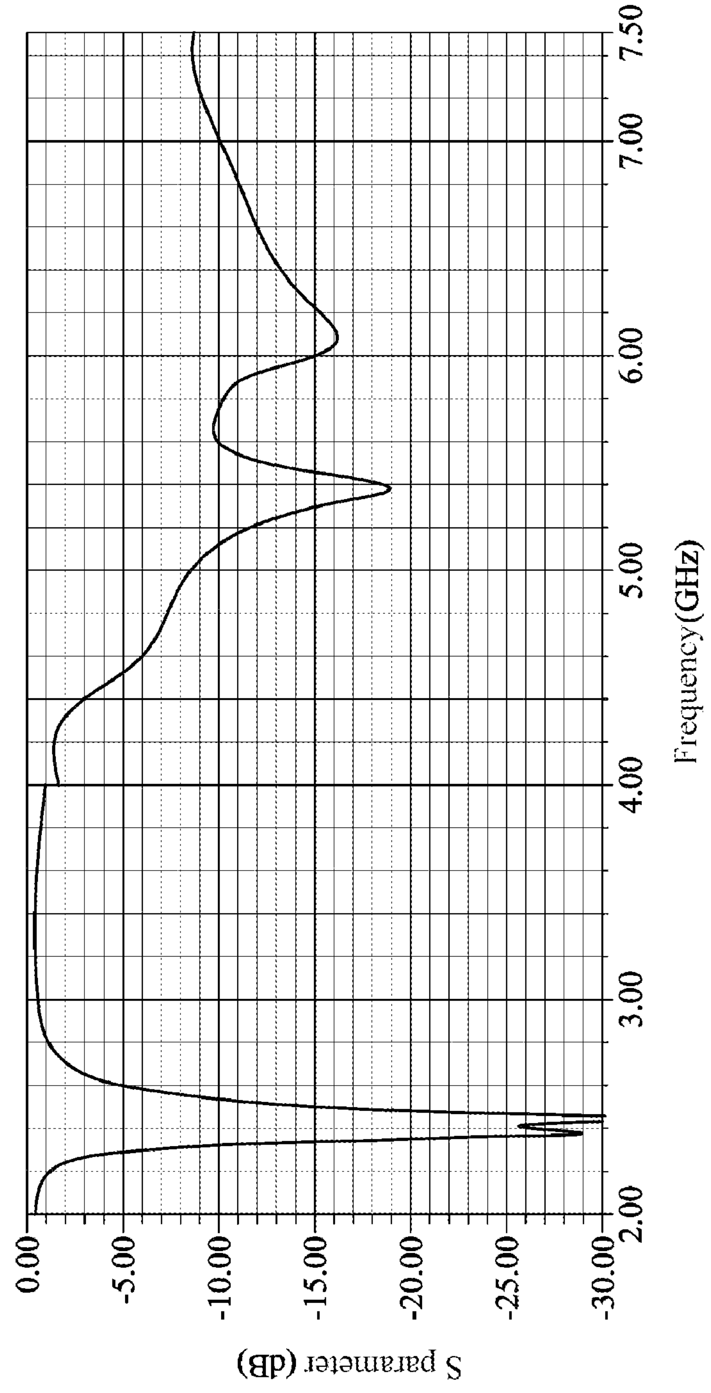
FIG. 5 is a schematic simulation diagram of an S parameter generated by a hinge antenna according to the disclosure at different frequencies.

The hinge antenna 18 provided in the disclosure does have a good reflection coefficient. Referring to FIG. 1 to FIG. 4, a size of the hinge antenna 18 is reduced to approximately 15 mm*12 mm*14 mm. When the hinge antenna 18 is transmitting a radio frequency signal, a simulation analysis of an S parameter (S11) is performed. When the hinge antenna 18 is in a low-frequency operating band and a high-frequency operating band, S parameter simulation results are shown in FIG. 5. From the curve shown in the diagram, reflectance coefficients (S11) shown on the diagram are all less than −5 dB (S11<−5 dB). This proves that the hinge antenna 18 has a good reflectance coefficient in both the low-frequency operating band and the high-frequency operating band, and meet a broadband range of 2400-2480 MHz and 5150-7150 MHz to achieve dual-frequency or multi-frequency operations. Therefore, the hinge antenna 18 in the disclosure has good antenna performance in the low-frequency operating band and the high-frequency operating band.

In the disclosure, an appropriate hinge antenna is designed, and the amount of mutual electromagnetic coupling between the hinge antenna and the horizontal fixed shaft of the hinge assembly is arranged, to cover the hinge assembly with the hinge antenna and form co-construction with an internal mechanism of the electronic device to achieve small modularization. Compared with a conventional hinge antenna, the biggest difference of the hinge antenna in the disclosure is that there is no need to provide an additional volumetric space without pieces and the hinge assembly is not directly used as the main radiation body. The former reduces the overall size of the hinge antenna, and the latter reduces development costs of the mechanical parts in research and development stages because it is not directly fed into the hinge assembly as the main radiation body. In the disclosure, the hinge antenna is disposed on the horizontal fixed shaft of the hinge assembly, and the hinge antenna is placed in the volumetric space of the original hinge assembly for structural coating. The miniaturized hinge antenna design is achieved by optimizing the related antenna design parameters of the antenna radiation pattern on the hinge antenna without mounting additional inductance components on the premise of not changing the hinge assembly. Moreover, the fixing assembly in the hinge assembly is used as part of the antenna to successfully implement the miniaturized hinge antenna design operable in a wireless local area network (WLAN) band. In the disclosure, the co-design of the metal fixing assembly is selected to minimize the variation caused by the assembly or hinge motion affecting the overall coupling amount of the antenna, thereby affecting the antenna characteristics. Only the feed-in contact position design of the hinge antenna and the antenna radiation pattern design in the antenna base (including a multi-sided radiation branch, a circulating geometry size, and a structure) are adjusted. With the above design, the overall size of the hinge antenna is effectively reduced and the required band design requirement is achieved.

Based on the above, the disclosure provides an electronic device co-constructed with a hinge antenna and the hinge antenna thereof. The hinge antenna is directly designed under an original appearance, or designed in an inner space of the hinge assembly. In this way, the hinge assembly and the hinge antenna are co-constructed to greatly reduce the overall size of the hinge antenna, and achieve an operating bandwidth (low band: 2400-2480 MHz, and high band: 5150-7150 MHz) and good radiation characteristics of a required broadband system. Therefore, in the disclosure, the size of the antenna design is reduced on the premise of maintaining the original appearance design, to improve the space utilization of the antenna and maintain good antenna radiation characteristics.

The above embodiments are merely to describe the technical ideas and characteristics of the disclosure to enable a person skilled in the art to understand the content of the disclosure and implement it accordingly, and are not used to limit the scope of the claims of the disclosure. That is, any equivalent change or modification made according to the spirit disclosed in the disclosure still falls within the scope of the claims of the disclosure.

What is claimed is:

1. An electronic device co-constructed with a hinge antenna, comprising:
- a first casing;
- a second casing;
- a hinge assembly, connected to the first casing and the second casing, so that the first casing and the second casing are opened and closed through rotation of the hinge assembly, wherein the hinge assembly comprises a horizontal fixed shaft;
- a hinge antenna, mounted on the horizontal fixed shaft and fixed on the hinge assembly; and
- a fixing assembly, wherein the fixing assembly fixes the hinge antenna onto the hinge assembly;
- wherein the hinge antenna further comprises:
- an antenna base, wherein an accommodating space and a fixed hole are provided in the antenna base, and the fixed hole is located on one side of the accommodating space;
- an antenna radiation pattern, located on the antenna base;
- a feed-in contact, located on the antenna base and electrically connected to the antenna radiation pattern to receive and transmit a radio frequency signal, and the feed-in contact is connected to a signal line; and
- a conductor portion, located on an inner wall of the fixed hole of the antenna base, wherein the fixing assembly passes through the hinge assembly and is fixedly connected to the fixed hole to be electrically connected to the conductor portion, so that the horizontal fixed shaft is located in the accommodating space to fix the hinge antenna onto the hinge assembly.

2. The electronic device co-constructed with a hinge antenna according to claim 1, further comprising a hinge cover, wherein the hinge cover is fixed on the hinge assembly and covers the hinge antenna, so that the hinge antenna is located between the hinge cover and the hinge assembly.

3. The electronic device co-constructed with a hinge antenna according to claim 2, wherein the hinge assembly comprises:
- a vertical fixed support plate;
- the horizontal fixed shaft, with one end connected to the vertical fixed support plate;
- a metal rolling bearing, located on an other end of the horizontal fixed shaft;
- a first locking member, vertically connected to the vertical fixed support plate to be located on one side of the horizontal fixed shaft for connecting to the first casing, wherein the hinge antenna and the hinge cover are fixed on the first locking member; and
- a second locking member, connected to the metal rolling bearing and located on an other side of the horizontal fixed shaft for connecting to the second casing.

4. The electronic device co-constructed with a hinge antenna according to claim 1, wherein the fixing assembly is a metal fixing assembly.

5. The electronic device co-constructed with a hinge antenna according to claim 1, wherein the electronic device is a notebook computer.

6. A hinge antenna, disposed on a hinge assembly of an electronic device, wherein the hinge assembly comprises a horizontal fixed shaft, and the hinge antenna comprises:
- an antenna base, wherein an accommodating space and a fixed hole are provided in the antenna base, and the fixed hole is located on one side of the accommodating space;
- an antenna radiation pattern, located on the antenna base;
- a feed-in contact, located on the antenna base and electrically connected to the antenna radiation pattern to receive and transmit a radio frequency signal; and
- a conductor portion, located on an inner wall of the fixed hole of the antenna base, wherein a fixing assembly passes through the hinge assembly and is fixedly connected to the fixed hole to be electrically connected to the conductor portion, so that the horizontal fixed shaft is located in the accommodating space to fix the hinge antenna onto the hinge assembly;
- wherein a hinge cover is further disposed on the hinge assembly, and the hinge cover is fixed on the hinge assembly and covers the hinge antenna, so that the hinge antenna is located between the hinge cover and the hinge assembly;
- wherein the electronic device further comprises a first casing and a second casing, and the hinge assembly is connected to the first casing and the second casing, so that the first casing and the second casing are opened and closed through rotation of the hinge assembly;
- wherein the hinge assembly comprises:
- a vertical fixed support plate;
- the horizontal fixed shaft, with one end connected to the vertical fixed support plate;
- a metal rolling bearing, located on an other end of the horizontal fixed shaft;
- a first locking member, vertically connected to the vertical fixed support plate to be located on one side of the horizontal fixed shaft for connecting to the first casing, wherein the fixing assembly passes through the first locking member to be fixedly connected to the fixed hole to fix the hinge antenna and the hinge cover onto the first locking member; and
- a second locking member, connected to the metal rolling bearing and located on an other side of the horizontal fixed shaft for connecting to the second casing.

7. The hinge antenna according to claim 6, wherein the feed-in contact is further connected to a signal line.

8. The hinge antenna according to claim 6, wherein the fixing assembly is a metal fixing assembly.

9. The hinge antenna according to claim 6, wherein the electronic device is a notebook computer.

10. An electronic device co-constructed with a hinge antenna, comprising:

a first casing;

a second casing;

a hinge assembly, connected to the first casing and the second casing, so that the first casing and the second casing are opened and closed through rotation of the hinge assembly, wherein the hinge assembly comprises a horizontal fixed shaft;

a hinge antenna, mounted on the horizontal fixed shaft and fixed on the hinge assembly; and a hinge cover, wherein the hinge cover is fixed on the hinge assembly and covers the hinge antenna, so that the hinge antenna is located between the hinge cover and the hinge assembly;

wherein the hinge assembly comprises:

a vertical fixed support plate;

the horizontal fixed shaft, with one end connected to the vertical fixed support plate;

a metal rolling bearing, located on an other end of the horizontal fixed shaft;

a first locking member, vertically connected to the vertical fixed support plate to be located on one side of the horizontal fixed shaft for connecting to the first casing, wherein the hinge antenna and the hinge cover are fixed on the first locking member; and a second locking member, connected to the metal rolling bearing and located on an other side of the horizontal fixed shaft for connecting to the second casing.

* * * * *